Figure 1:
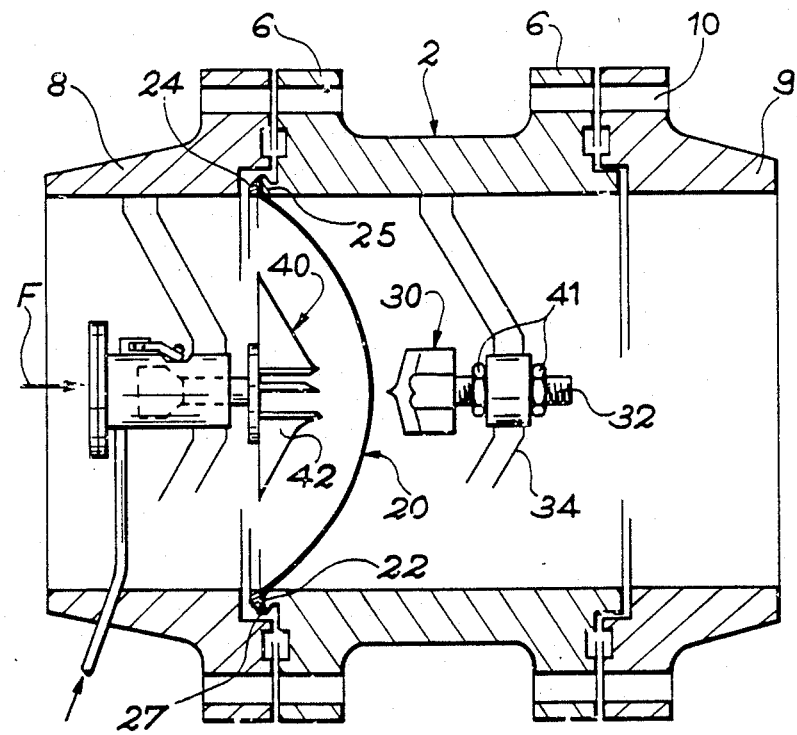

United States Patent [19]

Oberlin et al.

[11] Patent Number: 4,830,052

[45] Date of Patent: May 16, 1989

[54] DIAPHRAGM SAFETY DEVICE WITH UPSTREAM ACTIVE BURSTING KNIFE

[75] Inventors: Claude Oberlin, Avon; Jean Le Bras, Montereau, both of France

[73] Assignee: Electricite de France Service National, Paris, France

[21] Appl. No.: 134,686

[22] Filed: Dec. 18, 1987

[30] Foreign Application Priority Data

Dec. 18, 1986 [FR] France ................. 86 17728

[51] Int. Cl.⁴ .............................................. F16K 17/40
[52] U.S. Cl. ................................... 137/68.1; 220/89 A
[58] Field of Search ................... 137/68.1; 220/89 A, 220/89 R

[56] References Cited

U.S. PATENT DOCUMENTS

| | | | |
|---|---|---|---|
| 3,872,874 | 3/1975 | Nedelec et al. | 137/68.1 |
| 3,989,057 | 11/1976 | Muddiman | 137/68.1 |
| 4,434,905 | 3/1984 | Ou et al. | 220/89 A |
| 4,479,587 | 10/1984 | Mundt et al. | 220/89 A |
| 4,580,589 | 4/1986 | Le Bras et al. | 137/68.1 |
| 4,682,619 | 7/1987 | Clift et al. | 137/68.1 |

Primary Examiner—John Rivell
Attorney, Agent, or Firm—Nutter, McClennen & Fish

[57] ABSTRACT

A safety device for limiting the pressure of a fluid to a predetermined value comprises a preshaped diaphragm having a downstream convex face and an upstream convex face mounted as a closing or sealing device in a pipe. A first knife faces the convex face of the diaphragm at such a distance that a predetermined pressure exerted by the fluid on the concave face of the diaphragm brings the latter into contact with the knife which then causes a bursting of the diaphragm. A second knife is fitted to face the concave face of the diaphragm and a mechanism is provided for making the second knife strike against the diaphragm in order to bring about the tearing thereof when the concave face of the diaphragm is exposed by the fluid to a pressure below said predetermined pressure. The first knife has a passive operating mode, but the second knife has an active operating mode. With this latter mode, it is possible to burst the diaphragm at a pressure value which is well below that at which the diaphragm is burst by the first knife.

7 Claims, 2 Drawing Sheets

DIAPHRAGM SAFETY DEVICE WITH UPSTREAM ACTIVE BURSTING KNIFE

The present invention relates to a safety device equipped with a diaphragm, membrane or disk and a bursting or burster knife or cutter for limiting the pressure of a fluid.

It more particularly applies to the protection of an installation containing a fluid (i.e. a liquid or a gas) against the effects of overpressures, particularly in installations having large diameter discharge circuits with low diaphragm bursting and service pressures.

A safety device with a diaphragm and bursting knife is known for the purpose of limiting the pressure of a fluid from French patent application No. 8306111, filed on Apr. 14th 1983. In this device, the diaphragm can burst on a knife in accordance with two modes, namely the passive mode and the active mode.

In the first mode, the knife located downstream of the diaphragm is fitted in fixed manner in the device. The diaphragm can only burst after being sufficiently deformed in the direction of the knife, when the pressure reaches a predetermined pressure called the "bursting pressure", defined by a presetting of the distance betwen knife and diaphragm. Thus, the operation of said device can only be passive, i.e. it is absolutely dependent on the evolution of the amplitude of the pressure as a function of time in the protected installation.

In the second mode, the knife is mounted on a piston. This assembly is located downstream of the diaphragm in the safety device. By putting the piston into movement, controlled by a fluid pressure, the knife brings about the bursting of the diaphragm at a pressure value well below that obtained in the passive mode.

On a safety device able to operate in the active mode, the passive mode is retained.

Such a device ensures a generally satisfactory operation. However, under certain special conditions, it does not make it possible to reliably and effectively ensure the complete tearing of the diaphragm. This is particularly so when it is wished to limit the breaking pressure to a low value below 5 bars and when the duct has a large diameter so as to ensure a high flow rate. Thus, in this case, the dimensions of the diaphragm means that the latter has a limited thickness. Consequently when an active knife located upstream of said diaphragm strikes the latter, the diaphragm could turn inside out without bringing about a clearly defined tear.

The problem of the present invention is a safety device having a bursting knife solving the aforementioned problems.

More specifically, the present invention relates to a safety device for limiting the pressure of a fluid to a predetermined value, having a preshaped diaphragm with a convex face and a concave face mounted in the manner of a closing device in a pipe, and a knife positioned facing the convex face of the diaphragm at a distance from said convex face such that a predetermined pressure exerted by the fluid on the concave face of said diaphragm brings the latter into contact with the knife, which then brings about the bursting of the diaphragm, characterized in that it also has at least one knife mounted facing the concave face of the diaphragm and means for making said upstream knife strike the diaphragm in order to bring about the tearing of the latter when the concave face of the diaphragm is exposed by the fluid to a pressure below said predetermined pressure, the downstream knife facing the convex face and the upstream knife facing the concave face being fitted so as to clear away when the upstream knife strikes the diaphragm.

As a result of this device, it is possible to dimension the disk so as to obtain good mechanical strength characteristics thereof. The fracture thereof can be brought about for the passive and active operating modes, but the passive operating mode is alway retained.

For the passive operating mode, the bursting of the disk or diaphragm is solely dependent on the upstream pressure conditions. The value of the bursting pressure cannot exceed the design pressure of the protected installation. However, for the active operating mode, it is possible to burst the diaphragm at a pressure value, which can be well below the bursting pressure of the passive mode.

Preferably, the blades of the upstream knife or cutter are positioned radially with respect to a longitudinal axis of the pipe.

Other features and advantages of the invention can be gathered from the following description of a non-limitative embodiment and the attached drawings, wherein show:

FIG. 1 A diagrammatic view of a bursting device with an active upstream knife according to the invention.

Figure 2:
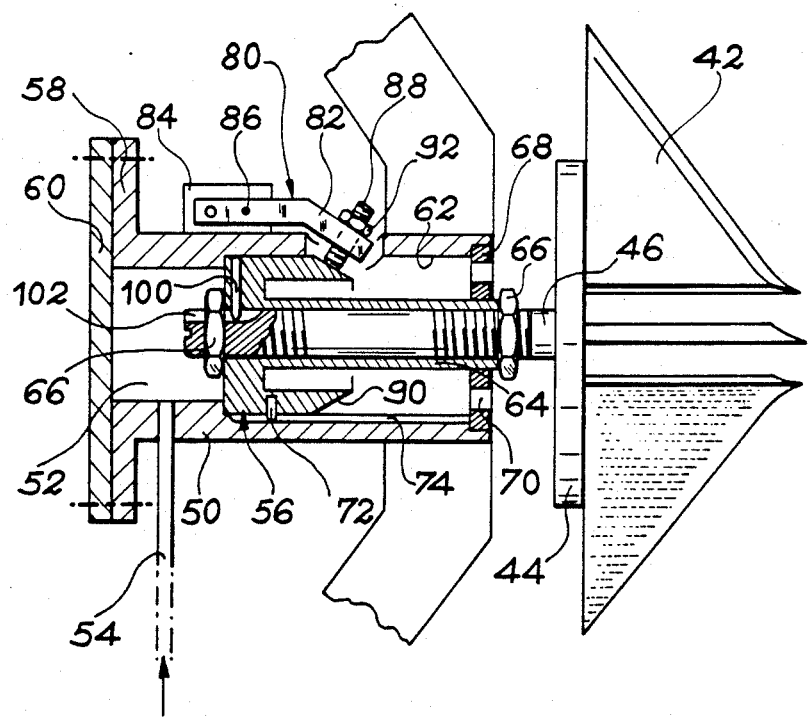

FIG. 2 A diagrammatic sectional view of the means for making the active knife strike the diaphragm.

Figure 3:
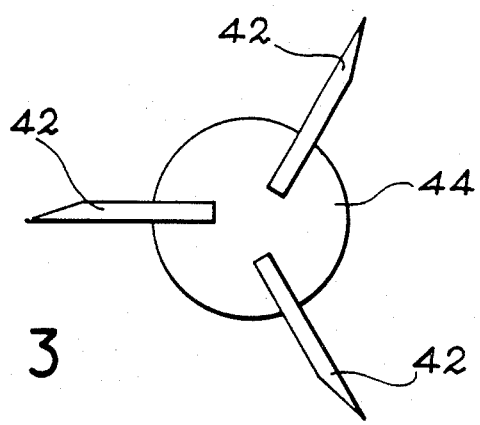

FIG. 3 An end view of an embodiment of the active knife.

Figure 4:
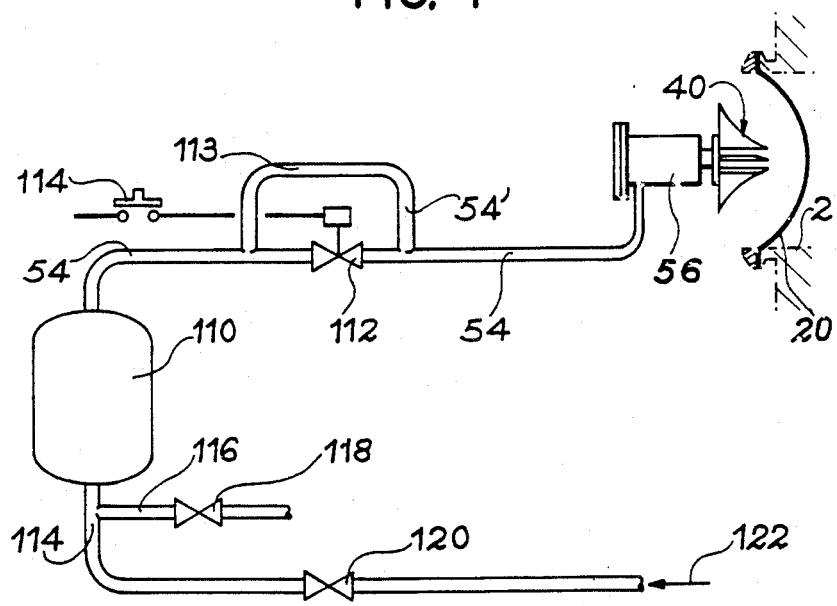

FIG. 4 A basic diagram illustrating the control of the means or bringing about striking of the knife.

FIG. 1 shows an embodiment of a safety device according to the invention for limiting the pressure of a fluid to a predetermined value. This device is located within a pipe connected, on the one hand, to a high pressure zone upstream of the pipe and shown to the left in FIG. 1 and, on the other hand, to a low pressure zone downstream of the pipe and shown to the right in FIG. 1.

In the represented embodiment, in order to facilitate the installation of the device, modular elements such as element 2 are placed on the pipe. Each element is in the form of a cylindrical hollow body with open ends respectively finished by flanges provided for the connection of modular element 2 to another modular element or to a duct 8 or 9 terminated by a flange complimentary to that of the modular element to which it is to be connected. In the embodiment of FIG. 1, the upstream duct is connected to the installation to be protected, whilst duct 9 is connected to a discharge tank.

Assembly means are provided between the flanges and e.g. are constituted by bolts passing into holes 10 made in the flanges, as well as safety washers and retaining nuts (not shown).

Sealing means, e.g. constituted by joints, are mounted at the ends of the modular element 2, so as to bring about a standard seal for the fluid with respect to the outside.

The safety device according to the invention firstly has a diaphragm 20 shaped like a spherical cap. On its periphery the diaphragm has a peripheral collar 22 connected to the spherical cap. The diaphragm is made from an appropriate metal, or some other non-metallic material. It is e.g. obtained by hydraulic forming or shaping from a metal side face.

Each diaphragm is associated with a reinforcing ring 24, e.g. made from metal and mounted in such a way that the corresponding peripheral collar 22 is engaged between said ring and a shoulder 25 of the flange of the end at which the diaphragm is located. The peripheral collar, the ring and the shoulder 25 are assembled by a lipped weld 27, which brings about the seal between the upstream and downstream areas of the diaphragm. The reinforcing ring 24 is designed so as to perfectly adapt to the connection between the hemispherical cap and the peripheral collar. This ring makes it possible to rigidify the connection, so that the corresponding diaphragm is able to withstand the stresses induced and does not turn inside out when duct 8 is placed under a vacuum, or during a rapid emptying of the protected installation, the latter causing a siphoning effect.

The concave face of the diaphragm is oriented towards the upstream side of the installation, while the convex face is oriented towards the downstream side. The pressure of the fluid symbolized by arrow F is exerted on the concave face of the diaphragm.

The device according to the invention also has a passive knife 30, mounted at the end of a threaded rod 32 screwed into a tapped hole provided in a cross-member 34 fixed by each of its ends to the modular element 2. The rotation of the threaded rod 32 makes it possible to advance or move back the end of knife 30 with respect to diaphragm 20, which makes it possible to regulate the pressure for which the diaphragm will be torn by the knife. Thus, the more the passive knife 30 is moved away from the diaphragm in the inoperative state, the greater the deformation of said diaphragm under the effect of pressure F necessary to enable the wall of the diaphragm to come into contact with the knife and undergo cutting. However, the closer knife 30 is positioned to the diaphragm wall, the lower the necessary bursting pressure. Finally, the safety device according to the invention has an active knife designated by the general reference 40. This knife can be seen on a larger scale in FIG. 2 and is shown in end view in FIG. 3. It has three identical blades 42 mounted on a circular plate 44 and positioned radially with respect to the axis of said plate. Three identical blades are shown in the present embodiment, but it is obvious that a different, e.g. larger number could be provided. However, the position of knife blades 42 with respect to knives 30 is chosen in such a way that there is no interference between the passive knife and the active knife during the displacement of the active knife. In other words, the blades of knife 30 must pass between the blades 42 of the active knife. Plate 44 is integral with the end of a threaded rod 46. The latter is connected to means permitting the striking of the concave face of the diaphragm by knife 40. These means are shown in section in FIG. 2.

The means permitting the striking of the diaphragm shown in FIG. 2 essentially comprise a hollow cylindrical part 50 having a circular shape of revolution, whose axis is aligned with that of pipe 2. The cylindrical part 50 forms a compression chamber 52. Means for supplying gas to the chamber and constituted by pipe 54 are provided. A piston 56 is located in cylindrical part 50. The end of hollow part 50 furthest from membrane 20 is provided with a fixing flange 58, on which is assembled a closing plate 60, e.g. by means of bolts indicated in mixed line manner.

The interior of the hollow part 50 has a first cylindrical portion, into which issues pipe 54 and a second, larger diameter cylindrical portion 62, in order to define a shoulder against which the piston 56 abuts.

Piston 56 has a main body extended by a rod 64, in which is provided a tapped hole for receiving the threaded rod 46. The latter is also provided with a groove permitting the introduction of a screwdriver for moving it forwards or backwards. A nut 66 is mounted on each of the ends of the threaded rod on either side of piston 56. A plate 68 closes the end of the hollow part 50, which is located nearest to the diaphragm. Plate 68 is provided with holes 70 permitting the circulation of gases, so that the displacement of the piston is not disturbed by their compression. Moreover, any rotation of the piston with respect to the hollow part 50 is prevented as a result of a key fixed to the periphery of the main piston body and engaged in a groove 74 parallel to the axis of the hollow part on the inner wall delimiting the second portion 62 with respect to the interior of the hollow part 50. The two nuts 66 make it possible to regulate the position of knife 30 with respect to the piston and therfore with respect to diaphragm 20.

Mechanical means are also provided for maintaining piston 56 against the shoulder of part 50. These means have a lever 82, whereof one end is articulated in rotation with an axis perpendicular to the longitudinal axis of part 50 on support 84 fixed to the hollow part and outside the same. The rotation of the lever is prevented by a pin 86 passing through lever 82 on the one hand and engaging in support 84 on the other. The free end of the lever has a tapped hole traversed by a screw 88, which bears on an inclined face 90 of the piston. A lock nut 92 is mounted on the other end of the rod. The displacement of screw 88 with respect to the lever makes it possible to adjust the position of the piston within the hollow part 50.

Any rotation of knife 40 with respect to piston 56 is prevented by a second key 100 fixed in a transverse hole of the piston and engaging in a longitudinal groove 102 provided in threaded rod 46.

FIG. 4 diagrammatically shows the means permitting the pressurized fluid supply of chamber 52 and therefore the control of active knife 40. Duct 54 issuing into chamber 52 is connected to a container for a pressurized fluid, such as a gas, e.g. argon. This container is designated by reference 110. An electrovalve 112 is placed between container 110 and part 56. This electrovalve can be controlled manually by means of a switch 114 operating an electric control. The electric control of the electrovalve can also be automatically controlled, e.g. by means of a pressure detector, or a hydrogen detector, which operates the electrovalve when a predetermined threshold is reached. Duct 54 also has a bypass line 54', on which is mounted a pyrotechnic device 113, which opens line 54'.

Container 110 is also connected to a second duct 114, in which is branched a duct 116, on which is mounted a purging electrovalve 118 making it possible to purge the container 10 of the gas contained therein. Duct 114, on which is engaged another electrovalve 120, brings about the argon supply to container 110, as indicated by arrow 122.

The aforementioned device functions as follows. The device is firstly able to function in accordance with a passive mode. In this case, the bursting of diaphragm 20 is solely determined by the upstream pressure F. The passive knife 30 is regulated to a fixed position. If the upstream pressure F rises beyond a predetermined design value to which the protected installation connected to duct 8 must not be exposed, the diaphragm deforms until it comes into contact with the knife 30, which brings about its fracture or tearing in a conventional manner. The device can also operate according to an active mode by means of knife 40. Firstly, the distance between knife 40 and diaphragm 20 is regulated by means of the threaded rod 46, which can be turned so as to move the knife 40 towards or away from the diaphragm. The position of the screw is then locked by means of nuts 66. If it is wished to burst diaphragm 20 for a pressure value F well below the calculated pressure for the passive operating mode, the displacement of active knife 40 is controlled by means of piston 56 by supplying pressure chamber 52 with pressurized fluid. This can be obtained manually by closing the electric contact 114 (cf. FIG. 4) or by means of a detector, which detects the pressure or a quantity linked therewith. When a predetermined threshold is reached, corresponding to the sought bursting pressure, the sensor closes the electrovalve in such a way that chamber 52 is supplied with pressurized argon, which brings about the displacement of piston 56. The force exerted on the piston is transmitted via threaded rod 88 to lever 80. When the stress applied to the shear pin 86 is adequate, the latter is sheared, which releases the knife-carrying piston. The knife then strikes diaphragm 20 and initiates a cut therein, which leads to its tearing. The knife 40 carried by the piston is cruciform. Its dimensioning is such as to provide sufficiently wide tears in diaphragm 20 to obtain the desired passage cross-section.

The pressurized fluid supply to chamber 52 can also be controlled via bypass line 54' and the pyrotechnic device contained therein.

Compared with the prior art devices, the safety device described hereinbefore makes it possible to solve the problem consisting of the fracturing of a safety diaphragm for a low pressure in an installation having a high pressure flow rate. The presently known devices, such as valves of varying sizes do not satisfactorily solve this problem. Thus, small valves have only limited for rates and large valves are very onerous and can be subject to cavitation when exposed to high flow rates. However, the safety device according to the invention constitutes a device, whose construction is not onerous and which makes it possible to operate a high flow rate duct, even for a relatively low pressure value. In certain applications, this device can replace an infrequently operated valve. It is then necessary to replace the diaphragm at every use.

I claim:

1. A safety device for limiting the pressure of a fluid to a predetermined value, having a preshaped diaphragm with a downstream convex face and an upstream concave face mounted in the manner of a closing device in a pipe, and a first knife positioned facing the downstream convex face of the diaphragm at a distance from the downstream convex face such that a predetermined pressure exerted by the fluid on the upstream concave face of said diaphragm brings the latter into contact with the first knife, which then brings about the bursting of the diaphragm, characterized in that it also has a second knife mounted facing the upsteam concave face of the diaphragm and means for making said second knife strike the diaphragm in order to bring about the tearing of the latter when the upstream concave face of the diaphragm is exposed by the fluid to a pressure below said predetermined pressure, the first knife facing the downstream convex face and the second knife facing the upstream concave face being fitted so as to clear away when the second knife strikes the diaphragm.

2. The device according to claim 1, characterized in that the second knife has a plurality of blades positioned radially with respect to a longitudinal axis of the pipe.

3. The device according to claim 2, characterized in that the means for making the second knife strike diaphragm have a portion which is able to move and in that the second knife is rendered integral with said portion and has a regulatable position with respect thereto.

4. The device according to claim 3, characterized in that the means for bringing about the striking of the diaphragm by the second knife comprise a chamber facing the downstream convex face of the diaphragm, means for supplying gas to said chamber for the pressurizing thereof, a piston, which on the one hand carries the second knife, the latter having a regulatable position with respect to the piston, and which on the other hand slides in said chamber during the pressurizing of the latter, in the direction of the upstream concave face of diaphragm and mechanical means for immobilizing the piston in the chamber and for moving aside under the action of a displacement of the piston during the pressurizing of the chamber.

5. The device according to claim 4, characterized in that the blades of the second knife are locked in rotation with respect to the piston and in that the piston is locked in rotation with respect to said chamber.

6. The device according to claim 3, characterized in that the means for bringing about the striking of the diaphragm by said knives are covered so as to make them fluid-tight.

7. The device according to claim 1, characterized in that said device comprises at least one modular hollow element open at both its ends and for each modular element, sealing means mounted at said ends, said diaphragm being mounted as a tight closing device for one of the ends of the modular element, the convex face of the diaphragm being oriented towards the inside of the modular element.

* * * * *